United States Patent [19]

Klein

[11] Patent Number: 4,787,685

[45] Date of Patent: Nov. 29, 1988

[54] SLIP-CONTROLLED BRAKE DEVICE FOR AUTOMOTIVE VEHICLES INCLUDING VACUUM POWER GENERATOR ASSEMBLY USED BOTH AS BRAKE POWER BOOSTER AND AS MODULATOR

[75] Inventor: Hans-Christof Klein, Hattersheim, Fed. Rep. of Germany

[73] Assignee: Alfred Teves GmbH, Frankfurt am Main, Fed. Rep. of Germany

[21] Appl. No.: 76,693

[22] Filed: Jul. 22, 1987

[30] Foreign Application Priority Data

Jul. 31, 1986 [DE] Fed. Rep. of Germany ....... 3625960

[51] Int. Cl.4 .............................................. B60T 8/32
[52] U.S. Cl. ..................... 303/114; 60/553; 60/555; 188/356; 303/56; 303/110; 303/115; 303/119
[58] Field of Search .............. 303/113, 114, 115, 117, 303/119, 2-3, 110, 111, 92, 50-56; 188/345, 356, 357, 355, 181; 60/553, 555-560, 545, 547.1, 574-578, 582; 180/197

[56] References Cited

U.S. PATENT DOCUMENTS

| | | | |
|---|---|---|---|
| 2,976,686 | 3/1961 | Stelzer | 60/556 |
| 3,578,820 | 5/1971 | Riordan | 303/114 |
| 3,597,012 | 8/1971 | Packer et al. | 303/115 |
| 3,640,067 | 2/1972 | Ingram | 188/345 X |
| 3,667,811 | 6/1972 | Okamoto et al. | 303/115 |
| 3,677,608 | 7/1972 | Lewis | 303/115 |
| 3,741,612 | 6/1973 | Ando | 303/115 |
| 3,752,537 | 8/1973 | Ochiai | 303/115 |
| 3,774,976 | 11/1973 | Parsons | 303/115 |
| 3,790,224 | 2/1974 | Ritsema | 303/115 |
| 3,790,228 | 2/1974 | Adahan | 303/115 |
| 3,967,636 | 7/1976 | Pauwels | 303/113 X |
| 4,096,696 | 6/1978 | Van House | 188/357 X |
| 4,099,792 | 7/1978 | Schmid et al. | 303/119 X |
| 4,462,642 | 7/1984 | Leiber | 303/119 |
| 4,655,511 | 4/1987 | Leiber | 303/50 X |
| 4,702,531 | 10/1987 | Kircher et al. | 303/119 X |
| 4,708,401 | 11/1987 | Klein | 303/114 X |

FOREIGN PATENT DOCUMENTS

1956702  5/1970  Fed. Rep. of Germany .
2538700  3/1977  Fed. Rep. of Germany .
3317629  11/1984 Fed. Rep. of Germany .

*Primary Examiner*—Douglas C. Butler
*Attorney, Agent, or Firm*—James B. Raden

[57] ABSTRACT

A brake power-controlled brake device for automotive vehicles is provided with a hydraulic master cylinder (11) which is, via a pneumatically actuated pressure modulator (12), connected to at least one wheel cylinder brake circuit I. The pressure modulator (12) comprises a vacuum power generator (20) and a compensating cylinder (18) equipped with a hydraulic piston (16, 16' or 16"), connected to which compensating cylinder is the wheel cylinder brake circuit I. If a brake slip signal occurs, the piston wall (14) of the vacuum power generator (20), which piston wall is normally applied by a vacuum on both sides, is temporarily connected with a higher pressure in the direction in which the volume in the compensating chamber (32) is increased. In addition, an isolating valve (15) is provided which is normally open but is closed when a brake slip signal occurs, and which is inserted in the connecting line (19) from the master cylinder (11) to the compensating chamber (32). According to the invention, the vacuum power generator (20) is, at the same time, used as a brake power booster.

9 Claims, 6 Drawing Sheets

SLIP-CONTROLLED BRAKE DEVICE FOR AUTOMOTIVE VEHICLES INCLUDING VACUUM POWER GENERATOR ASSEMBLY USED BOTH AS BRAKE POWER BOOSTER AND AS MODULATOR

BACKGROUND OF THE INVENTION

The present invention relates to a slip-controlled brake device for automotive vehicles with a hydraulic pressure generating arrangement which is, via a pneumatically actuated pressure modulator, connected to at least one hydraulic wheel cylinder brake circuit. The pressure modulator comprises a vacuum power generator and a compensating cylinder equipped with a hydraulic piston connected with the piston wall of the vacuum power generator which wall is pre-loaded into the inoperative position by means of a return spring. The compensating cylinder's compensating chamber communicates with the wheel cylinder brake circuit, and a higher pressure is temporarily applied to the piston wall of the vacuum power generator in the direction which increases the volume in the compensating chamber. A normally open isolating valve is located in the connecting line between the pressure generating arrangement and the compensating chamber. When a brake slip signal derived from a brake slip control circuitry occurs, the piston wall is normally supplied with a vacuum on both sides and the isolating valve is closed.

In my copending application U.S. Ser. No. 944,242 filed Dec. 18, 1986 (German printed and published patent application No. 35 45 236), independent vacuum power generators are provided for brake power boosting and pressure modulation. In order to relieve the connected wheel cylinder brake circuit and/or the connected wheel cylinder brake circuits in the event of a brake slip control action, electromagnetically actuated opening valves are arranged between the pressure modulator and the wheel cylinder brake circuit.

SUMMARY OF THE INVENTION

It is the object of the present invention to create a brake slip-controlled brake device for automotive vehicles of the aforementioned type, which provides both a pneumatic brake power boosting and a quick and reliably responding brake slip control. It is an object of this invention to provide such a device that has simpler design and fewer structural members.

In order to achieve the objects, the present invention provides that the vacuum power generator is used, at the same time, as a brake power booster in that (a) the hydraulic piston asumes, in the inoperative position, the end position providing the largest possible volume in the compensating chamber;

(b) a vacuum-atmospheric pressure-control valve is, via an alternating valve, connected to the vacuum power generator such that, during normal braking, a first cylinder chamber, which, in the event of a pressurization, acts upon the piston wall in the direction to decrease the volume in the compensating cylinder, is pressurized to a smaller or larger degree by the atmospheric pressure in a manner, which is controlled by the hydraulic pressure of the pressure generating arrangement, whereas a second cylinder chamber is connected to the vacuum, and that after the switching over of the alternating valve, the first cylinder chamber is connected to the vacuum and the second cylinder chamber is pressurized to a smaller or larger degree by the atmospheric pressure when a brake slip signal occurs; and (c) the isolating valve is closed each time at the beginning of the pressure build-up by means of the pressure generating arrangement.

According to the present invention, both for the brake power boosting and for the brake slip control, only one single vacuum power generator is thus required. The associated hydraulic piston takes over both the brake power generation during normal braking and the brake power reduction when a brake slip occurs.

The alternating valve is, expediently, provided with a third position, a rest position in which all connections are closed.

The inventive hydraulically actuated brake power booster is advantageous in that, in the event of a brake slip occurring, the pedal-actuated brake circuit and the controlled brake ciruit are decoupled in a most simple way.

A first practical embodiment is characterized in that the hydraulic piston is shaped in the form of a stepped piston whose annular step is arranged on the side of the hydraulic piston directed away from the compensating chamber. The connecting line ends in the annular pressure chamber at the annular step and the isolating valve is arranged in a channel of the hydraulic piston which channel connects the annular pressure chamber and the compensating cylinder.

In this case it is, in particular, provided that the isolating valve is pre-loaded by a spring in the direction of closure and is closed when the hydraulic piston is displaced from the inoperative position. It is opened in opposition to the force of the spring by a tappet acting from the opposite side when the hydraulic piston assumes the completely retracted position.

If the aforementioned embodiment further provides that a piston rod is, from the side of the annular step of the hydraulic piston, sealedly guided from the compensating cylinder into the directly axially adjacent vacuum power generator, a reaction force corresponding to the generated brake power and, in addition, a corresponding pedal travel are obtained at the brake pedal.

In another embodiment it is, in contrast, provided that the hydraulic piston is equipped with a pressure compensating annular step which is arranged axially opposite the annular step and has the same size. A pedal travel simulator comprising a piston is connected to the connecting line, whereby from the piston part equipped with the pressure compensating annular step, a piston rod is sealedly guided from the compensating cylinder into the directly axially connected vacuum power generator. In this case, there is a pressure balance at the hydraulic piston so that a pedal travel is not made available. For this reason, the pedal travel simulator is provided.

Finally, it is, according to a third embodiment, also possible to arrange the isolating valve outside the compensating cylinder in the connecting line. It is pre-loaded into the closed position by a spring, and is held in the open position by a piston, in the opposite direction, until the hydraulic pressure in the connecting line moves the piston away from the isolating valve, in opposition to the force of a retracting spring.

It is particularly expedient that the piston be, at the same time, a component part of a pedal travel simulator.

In order to ensure, in the event of a failure of the vacuum, that the pedal travel simulator is cut-off automatically, another embodiment is characterized in that the pressure chamber of the cylinder comprising the piston is connected to the connecting line via a switchable non-return valve. The vacuum-controlled actuating device opens the non-return valve when a vacuum prevails and otherwise closes it.

It is of particular advantage that the pressure generating arrangement be a hydraulic master cylinder which is acted upon by the brake pedal. However, the inventive modulators with the isolating valve can, in principle, also be acted upon without pedal actuation, e.g. by means of an electric actuation, a pressure in a brake circuit or a pressure train. This would be an important prerequisite for an anti-slip control unit, an active stopping aid or a radar-controlled emergency brake system. But, for future wire-controlled brake systems, too, the inventive modulator constitutes an important element.

BRIEF DESCRIPTION OF THE DRAWING

The present invention will be described in the following by means of the accompanying drawings, wherein.

DETAILED DESCRIPTION OF THE INVENTION

Figure 1:
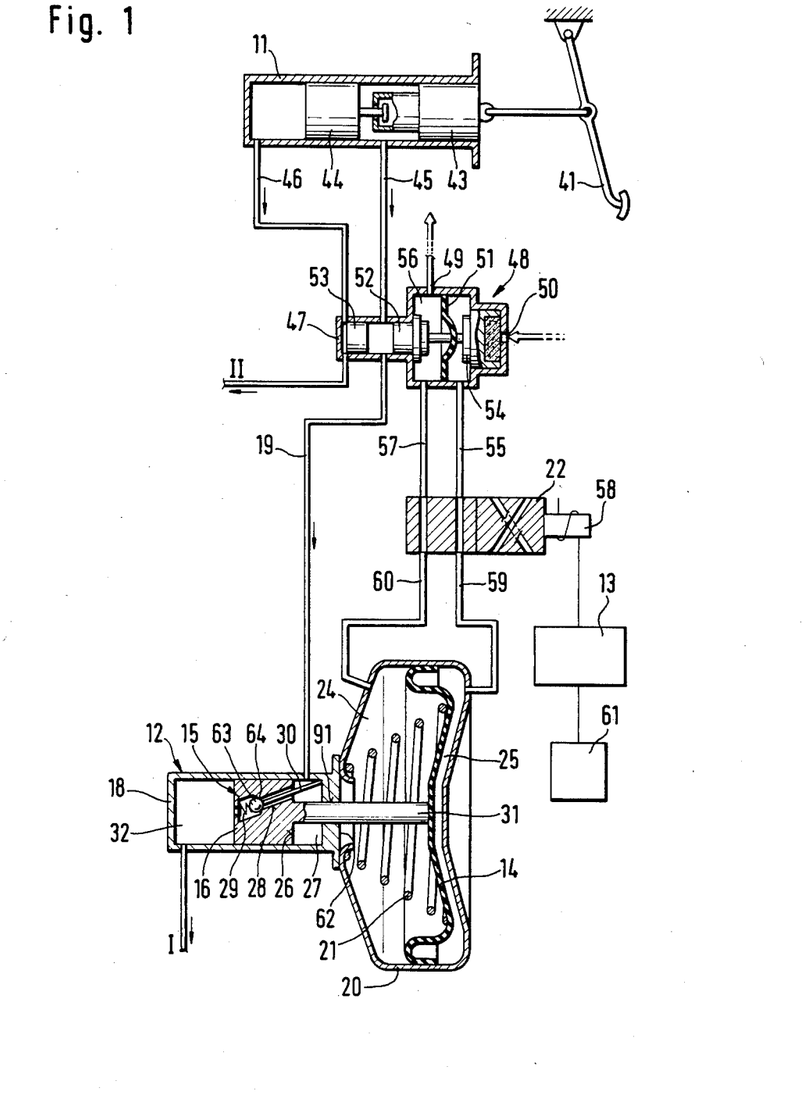
FIG. 1 is a schematic, partial section drawing of a first embodiment of a slip-controlled brake device for automotive vehicles in accordance with this invention.

According to FIG. 1, the brake pedal 41 of an automotive vehicle acts upon both pistons 43, 44 of a hydraulic tandem master cylinder 11 which pressurizes two hydraulic lines 45 and/or 46 leading to the brake circuits I and/or II. The lines 45, 46 lead to the pressure control part 47 of a vacuum control valve 48. Such a vacuum control valve 48 includes a vacuum connection 49 and an atmospheric pressure connection 50. Both connections are separated from each other by means of a pressure-tight diaphragm wall 51.

The pressure control part 47 accommodates two pistons 52, 53 located to be acted upon by the pressure in the lines 45 and/or 46 and acts upon a valve 54, situated within the area of the atmospheric pressure connection 50, in a manner such that the valve 54 opens if a hydraulic pressure occurs in at least one of the hydraulic lines 45, 46. When valve 54 opens, pressure is frequent at the first pneumatic line 55. When the valve 54 is closed, a vacuum prevails within this area.

On the opposite side of the diaphragm 51, a vacuum 49 which is obtained by means of a suitable connection to the vehicle engine prevails in any case. A second pneumatic line 57 leads from the vacuum chamber 56 of the vacuum control valve 48 to an alternating valve 22 to which the first pneumatic line 55 is also connected. Pneumatic lines 55 and 57 are connected to outlet lines 59 and 60, respectively, in one position of the valve 22. The alternating valve 22 is acted upon by an electromagnet 58 such that it can be displaced from the normal position, as shown in FIG. 1, into a position in which the pneumatic lines 55, 57 are connected to the outlet lines of the alternating valve 22 in an opposite arrangement, i.e., lines 55 and 57 are connected to lines 60 and 59, respectively.

The electromagnet 58 is connected to brake slip control circuitry 13 acted upon by a brake slip sensor 61 which transmits a brake slip signal to the brake slip control ciruitry 13 in the event of a brake slip occurring at any one of the associated vehicle wheels. The brake slip control circuitry 13 thereupon switches the alternating valve 22 momentarily over from the normal position, as shown in FIG. 1, into the alternate position obtained by a shifting to the left.

The outlet lines 59, 60 of the alternating valve 22 are connected to the two cylinder chambers 24, 25 of a vacuum power generator 20. A piston wall 14 is axially displaceably arranged in the chambers and a return spring 21 pre-loads the piston wall 14 into its inoperative position toward the right as shown in FIG. 1.

A piston rod 31 sealingly extends from the middle of the piston wall 14 through the chamber 24 and a bore 91 in the right end face 62 of a compensating cylinder 18 which is axially attached to the vacuum power booster 20. The free end of the piston rod is formed with a hydraulic piston 16 which is axially slidingly arranged within said compensating cylinder 18 and which is shaped in the form of a stepped piston provided with an annular step 26 arranged around the piston rod 31. The vacuum power generator 20 and the hydraulic piston 16 constitute together, among other things, a pressure modulator 12.

A channel 28 runs through the hydraulic piston 16 in a generally axial direction and accommodates an isolating valve 15 in the form of a ball 63 which is pressed against a seat 64 formed at the beginning of the channel 28 by means of a spring 29 acting from the side directed away from the piston rod 31. A tappet 30 extends from the opposite side of the ball 63 through the channel 28 to the inside of the end face 62 where the tappet abuts.

The wheel cylinder brake circuit I is connected to the left end of the compensating cylinder 18.

The annular pressure chamber 27 between the inner end of the compensating cylinder 18 and the annular step 26 of the hydraulic piston 16 is connected to the hydraulic line 45 through the intermediary of a connecting line 19 as well as the pressure control part 47 of the vacuum control valve 48.

The mode of operation of the brake device for automotive vehicles described above is as follows:

When the brake pedal 41 is depressed, the pistons 43, 44 in the tandem master cylinder 11 are moved to the left, as shown in FIG. 1, and build up a pressure being in the hydraulic lines 45, 46 which propagates via the connecting line 19, the annular pressure chamber 27, the channel 28 and the compensating reservoir 32 in the compensating cylinder 18 to the wheel cylinder brake circuit I. At the same time, the valve 54 in the vacuum control valve 48 is opened more and more, depending on the pressure build-up, by means of the pressure control part 47, so that atmospheric pressure is transmitted via the pneumatic line 55, the alternating valve 22 and the outlet line 59 to the second cylinder chamber 25 of the vacuum power generator 20. The latter, therefore, moves to the left, as shown in FIG. 1, the tappet 30 lifting off the end face 62 and closing the isolating valve 15 due to the effect of the spring 29.

In the further course of the movement of the hydraulic piston 16, an increased pressure causing the braking of the vehicle is being built up in the wheel cylinder brake circuit I due to the superposition of the hydraulic pressure in the annular chamber 27 and the pneumatic pressure in chamber 25 of the vacuum power generator 20.

If the brake slip sensor 61 now reports a beginning brake slip of the wheel and/or wheels braked by the corresponding part of the automatic vehicle brake to the brake slip control circuitry 13, the latter supplies a reversing signal to the electromagnet 58 which signal switches the alternating valve 22 to the left, as shown in FIG. 1. The outlet line 59 is thereby connected to the vacuum chamber 56 and the outlet line 60 to the atmospheric pressure via the open valve 54. Hereupon, the pressure ratios in the cylinder chambers 24, 25 of the vacuum power generator 20 are abruptly reversed, which results in a correspondingly sudden relief of the pressure in the wheel cylinder brake circuit I. Due to this effect, a brake slip is prevented at the braked wheel and/or wheels. The alternate switching of the alternating valve is effected at a high frequency, corresponding to the brake slip.

In the following figures, corresponding parts have been marked with the same reference numerals as in FIG. 1 and parts which have the same function have been marked with like reference numerals followed by a prime designation.

Figure 2:
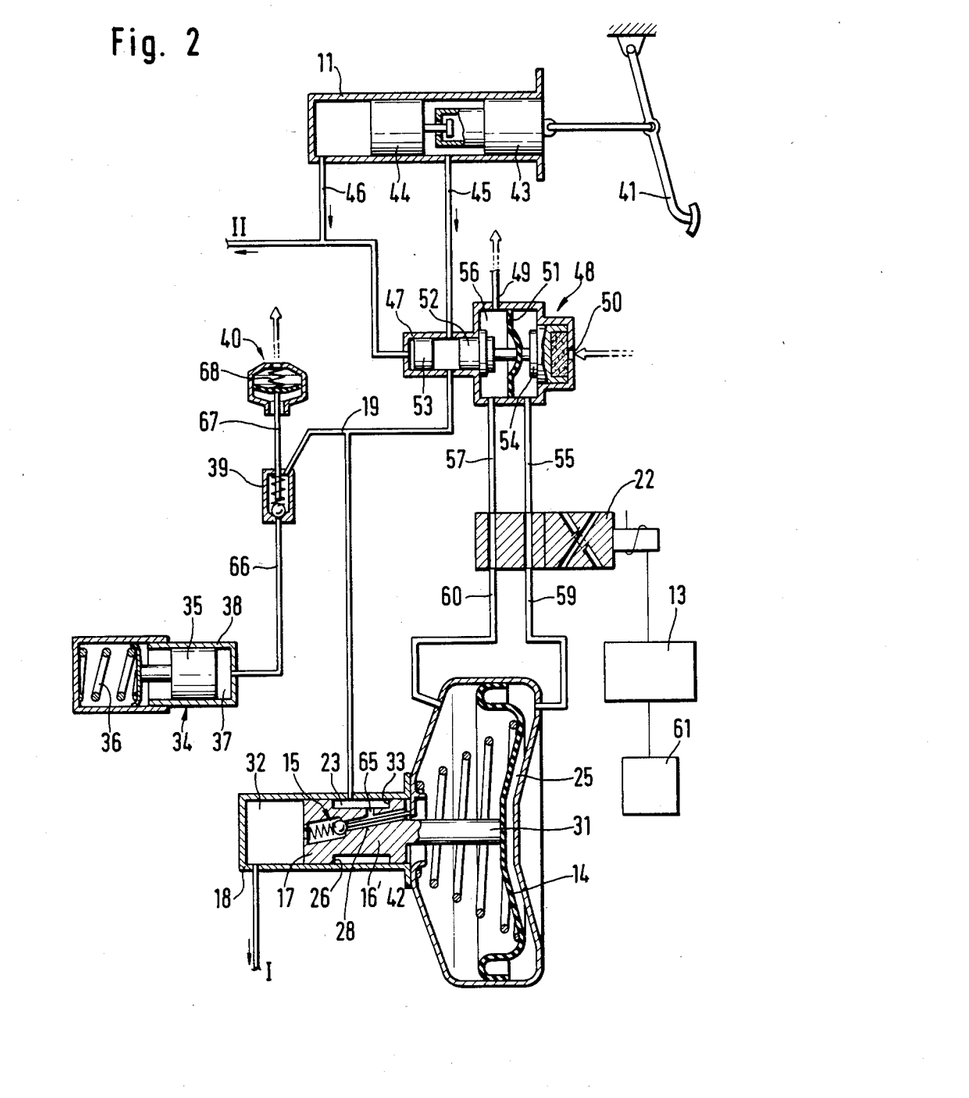
FIG. 2 is a similar schematic drawing of a second embodiment in accordance with this invention.

In the embodiment of FIG. 2, the hydraulic piston 16' is, provided with a pressure compensating annular step 33 axially opposite the annular step 26, whereby an annular chamber 23 is provided between the piston parts 17, 42 which piston parts are slidingly and tightly displaceable within the compensating cylinder 18. The annular chamber 23 is connected to the connecting line 19 and, via a bore 65, to the channel 28. Due to this design, a pressure generated in the annular chamber 23 via the connecting line 19 does not exert an axial force onto the hydraulic piston 16'. After the isolating valve 15 has been closed, pressure fluid is, in addition, no longer taken from the line 19.

In order to generate, nevertheless, a travel at the pedal 41 during braking, the connecting line 19 is, via a switchable non-return valve 39, connected to a pedal travel simulator 34 comprising a piston 35 which is displaceable within a cylinder 38, and which is, from one side, supplied with the hydraulic pressure of the connecting line 19 via the non-return valve 39 and a line 66, and from the opposite side by a retracting spring 36.

The non-return valve 39 is switchable through the intermediary of an actuating device 40 which is connected to the same vacuum as the vacuum control valve 48. When a vacuum is prevailing, the tappet 67 of the non-return valve 39 is attracted and opened so that a through-going connection is established between the connecting line 19 and the connection line 66. If the vacuum fails, the tappet 67 is moved, through the effect of a closing spring 68, into the closed position wherein the non-return valve 39 can only be opened by means of a return pressure generated by the piston 35 and the effect of the spring 36, provided a lower pressure prevails in the connecting line 19.

The mode of operation of the embodiment according to FIG. 2 corresponds to that of FIG. 1. The piston 35, however, being increasingly moved to the right, as shown in FIG. 2, by pressing the retracting spring 36 as the pressure in the connecting line 19 increases, since a correspondingly increasing hydraulic pressure is generated in the pressure chamber 37 when the non-return valve 39 is open.

When the brake pedal 41 is released, the pressure in the connecting line 19 decreases and results in a renewed closing of the valve 54 and thus in a renewed application of vacuum to the second cylinder chamber 25. This results in a return movement of the piston 35 into its inoperative position. The pressure fluid from the pressure chamber 37 flows back through the open non-return valve 39.

If the vacuum fails, the piston wall 14 maintains the inoperative position as shown in FIGS. 1 and 2, and the wheel cylinder brake circuit I is directly acted upon by the master cylinder via the channel 28 and the open isolating valve 15. In this case, the vacuum valve 39 is closed by means of the actuating device 40, thus preventing the pressure fluid in the connecting line 19 from entering the pressure chamber 37 of the cylinder 38.

With the aforementioned embodiment, no reactions will occur on the brake pedal 41 during the brake slip control action. The brake slip control action is, in addition, independent of the pedal force. The characteristic curve of the pedal will be determined exclusively by means of the pedal travel simulator 34.

Another particularly important fact consists in that the isolating valve 15 is shaped in the form of a non-return valve such that the isolating valve 15 opens automatically when, in whatever position of the hydraulic piston 16, the pressure in the connecting line 19 exceeds that in the compensating chamber 32. This is a safety measure which means that the automatic brake slip control is only in operation as long as the pressure in the wheel cylinder brake circuit I exceeds that prevailing in the connecting line 19.

Figure 3:
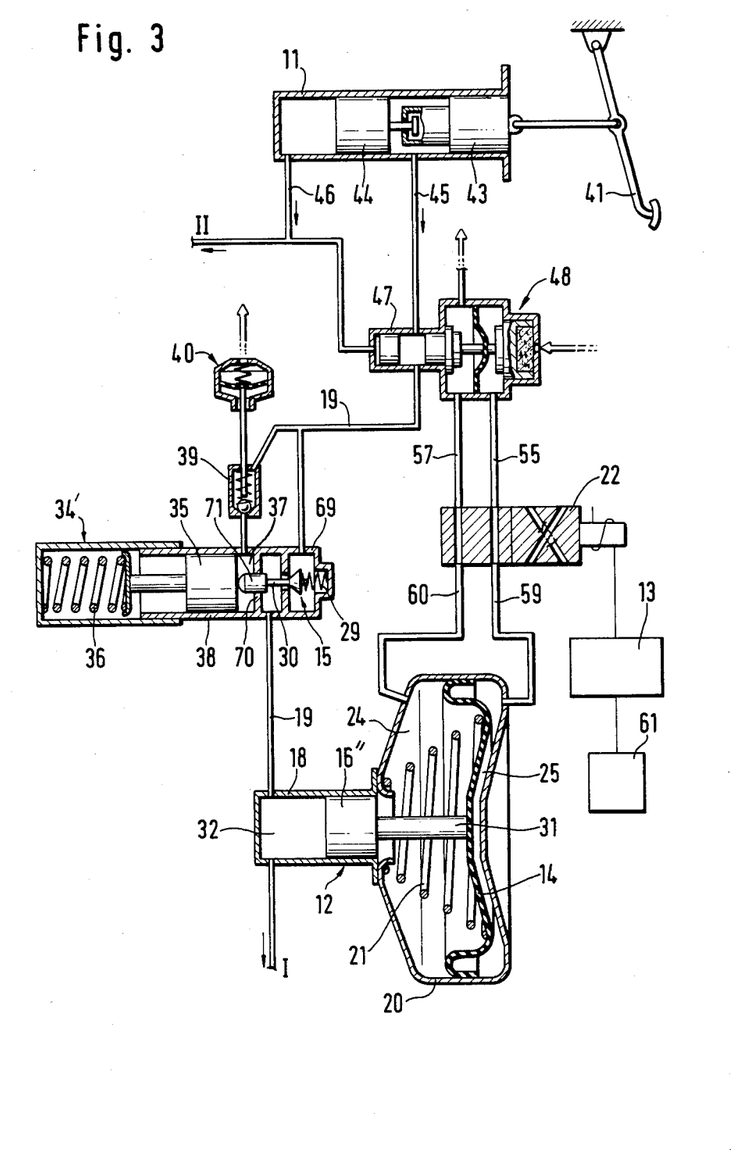
FIG. 3 is a similar schematic drawing of a third embodiment in accordance with this invention.

In the embodiment according to FIG. 3, the isolating valve 15 is arranged in its own housing 69, completely isolated from the compensating cylinder 18. The connecting line 19 passes through the isolating valve 15 to the compensating cylinder 18 which comprises only a simple, axially displaceable hydraulic piston 16'.

The tappet 30 of the isolating valve 15, which tappet is provided for the latter's actuation, extends through an axial opening in a partition wall 70 of the housing 69 in a sealingly sliding manner. The pressure chamber 37 of the pedal travel simulator 34 is on the other side of the partition wall 70. By this means, the end 71 of the tappet 30 extends into the pressure chamber 37 and can engage with the piston 35.

Due to this arrangement, the vacuum power generator 20 still operates, together with the compensating cylinder 18, both as brake power booster and as pressure modulator 12. Only the function of the isolating valve 15 has been located outside this arrangement.

In the inoperative position depicted in FIG. 3, the isolating valve 15 is in the open position since the retracting spring 36 of the pedal travel simulator 34' urges the piston 35 against the tappet 30. Thus the retracting spring 36 has a greater force than the spring 29 which tries to urge the isolating valve 15 into the closed position.

If a pressure is now being built up in the connecting line 19 by depressing the brake pedal 41 - with the non-return valve 39 normally being open said pressure propagates directly into the wheel cylinder brake circuit I until the isolating valve 15 closes under the influence of the spring 29 due to a return movement of the piston 35 to the left, as shown in FIG. 3.

From now on, the pressure generation in the compensating cylinder 18 is exclusively achieved by displacing the piston wall 14 of the vacuum power generator 20 to the left and the corresponding shift of the hydraulic piston 16' into the compensating chamber 32. In the event of a brake slip occurring, a controlled rhythmic pressure relief can now also be achieved in the compensating reservoir 32, as is the case in the preceding embodiments.

The more the pressure in the connecting line 19 increases, the further the piston 35 is displaced by compressing the spring 36, through which means the pedal travel is simulated. During this phase, the isolating valve 15 remains always closed until the pressure in the connecting line 19 has decreased such that the piston 35 assumes its rest position and moves the isolating valve 15 via the end 71 and the tappet 30 into the open position.

Figure 4:
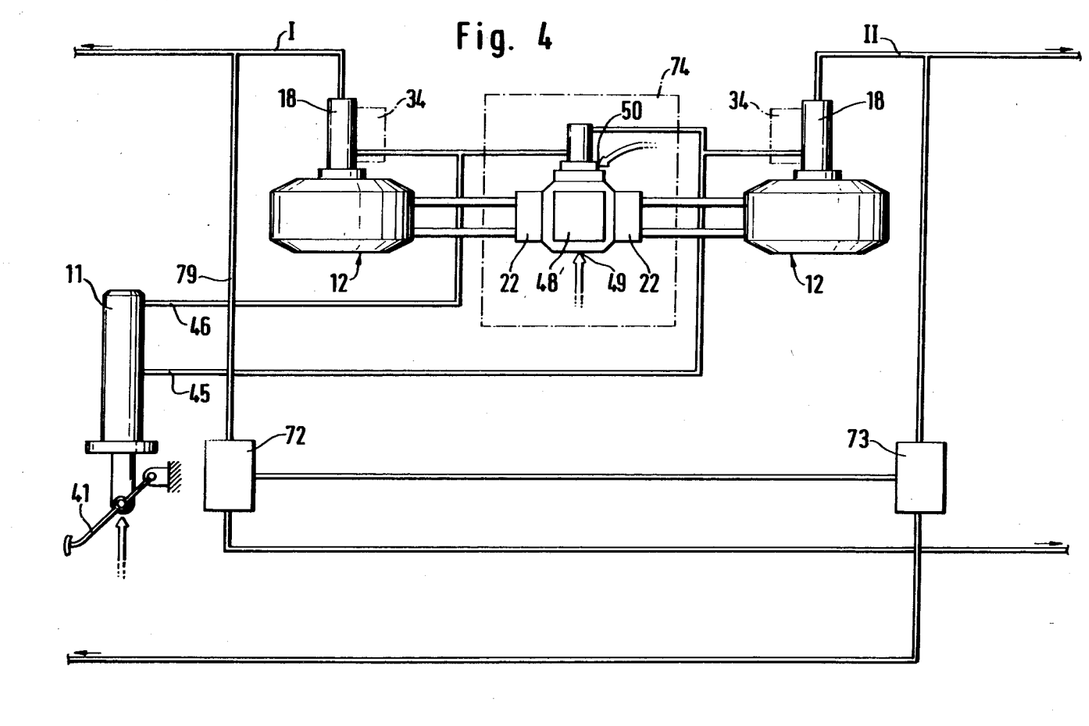
FIGS. 4-6 illustrate the arrangement of slip-controlled brake devices according to this invention in slip-controlled brake systems for automotive vehicles.

According to FIG. 4, the hydraulic lines 45, 46 of the tandem master cylinder 11 are connected to a double vacuum valve 48' acting, via two alternating valves 22 attached thereto, upon two combined brake power boosters/modulators 12 which act upon a brake circuit I and/or II, respectively. The brake circuit I acts upon the wheel brake cylinder at the left front wheel and via a brake pressure control unit 72 at the right rear wheel, whereas the brake circuit II acts upon the wheel brake cylinder at the right front wheel and via a brake pressure control unit 73 at the left rear wheel. Brake pressure control units 72 and 73 are in the form of solenoid operated valves of the type disclosed in my copending application referenced above. The double acting vacuum valve 48' is two of the valves 48, one for circuit I and another for circuit II.

The double vacuum control valve 48' can preferably be constituted such that it forms a joint cluster 74 together with the alternating valves 22.

The pedal travel simulators 34 and the combined brake power boosters/modulators 12 are expediently combined in a unitary construction i.e., the housing of simulators 34 and power boosters/modulators 12 can be integrally formed or fastened together.

However, an integration of the pedal travel simulators 34 in the cluster 74, i.e., integrally forming housings or fastening them together, would be of advantage. In this case, only one slave cylinder portion would be required for both functions.

Figure 5:
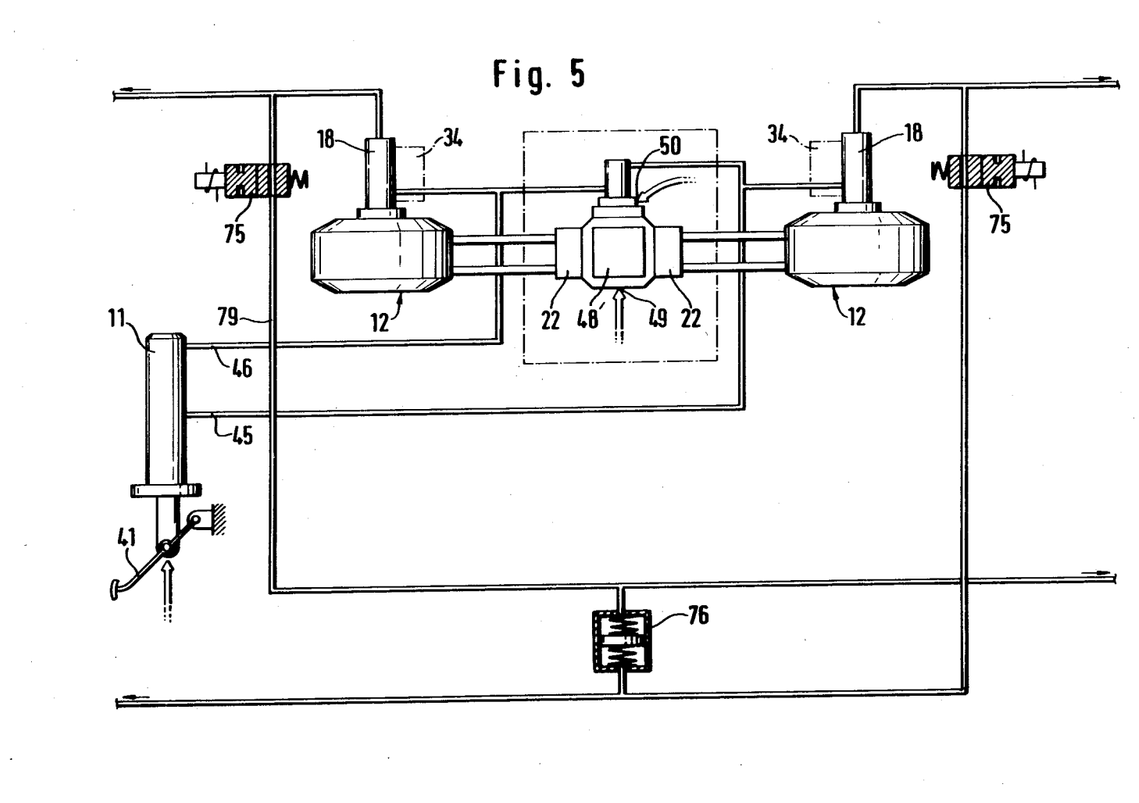

FIG. 5 shows a similar arrangement, the rear axle brake circuits being, however, adapted to be cut off by means of closing valves 75 which are controlled by the hydraulic pressure. The aim of this arrangement is to carry out an electronically controlled brake power control.

In addition, a volume compensating unit 76 is arranged between the two rear axle brake circuits.

Figure 6:
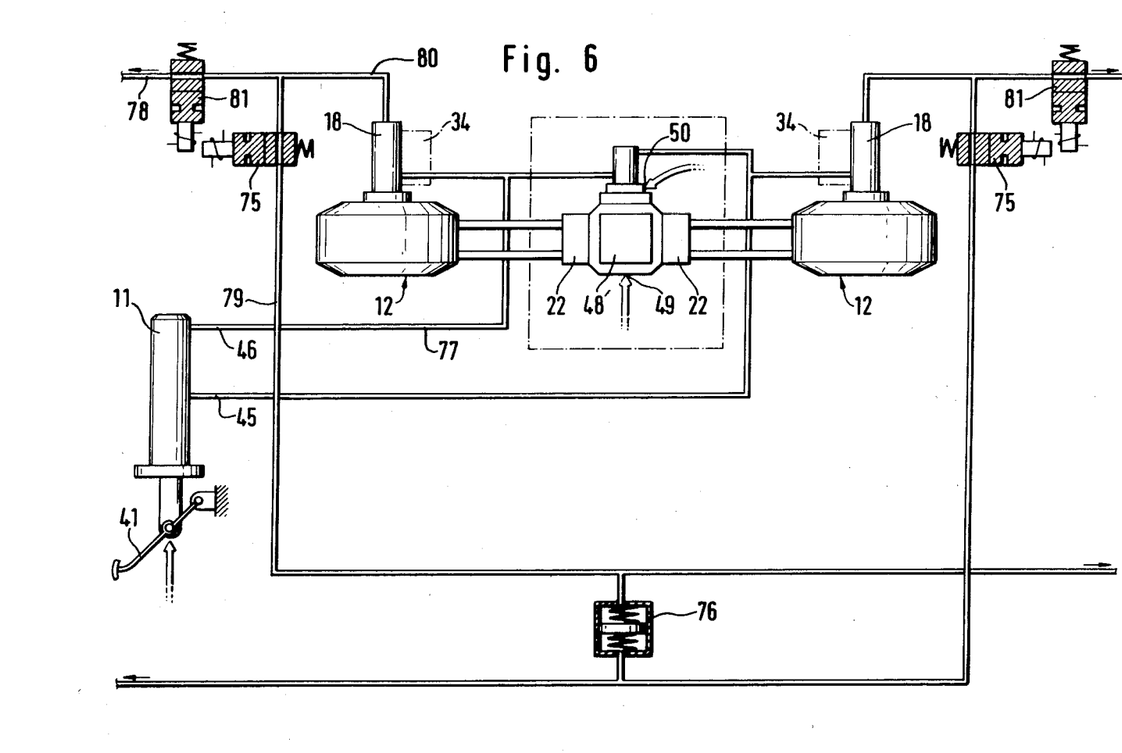

According to FIG. 6, a closing valve 81 is inserted in each of the front axle brake circuits as well. Due to the combination of the closing valves 75, 81, an automatic anti-lock-multiplex-operation of front and rear wheel is achieved in a diagonal brake circuit split. In other words, the brake actuating pressure, e.g. at the front left and the rear right wheel cylinder (and/or front right and rear left), can be built up by the pressure modulator 12 and/or 12', corresponding to the state of the wheel rotation, in a manner which is controlled by the automatic anti-lock electronic unit. A twofold two-channel control is, thereby, achieved. An important fact is that in both cases the system remains traction slip-controllable by means of the valve 75.

What is claimed is:

1. A slip-controlled brake device for automotive vehicles, said device comprising a hydraulic pressure generating arrangement connected to at least one hydraulic wheel cylinder brake circuit via a pneumatically actuated pressure modulator, the pressure modulator comprising a vacuum power generator having a piston wall and further comprising a compensating cylinder including a hydraulic piston connected with the piston wall of the vacuum power generator, the piston wall being pre-loaded into an inoperative position by means of a return spring, said compensating cylinder including a compensating chamber communicating with the wheel cylinder brake circuit, and brake slip control circuitry for detecting a wheel slip and issuing a brake slip signal, said brake slip signal being operative to apply a higher pressure to the piston wall of the vacuum power generator in the direction in which the volume in the compensating chamber is increased, said piston wall being normally supplied a vacuum on both sides, a normally open isolating valve inserted in a connecting line from the pressure generating arrangement to the compensating chamber, said brake slip signal closing said isolating valve, said vacuum power generator being operative as a brake power booster in that (a) the hydraulic piston assumes, in the inoperative position, the end position providing the largest possible volume in the compensating chamber;

(b) a vacuum-atmospheric pressure-control valve is, via an alternating valve, connected to the vacuum power generator via an alternating valve such that, during normal braking, a first cylinder chamber is located so that in the event of a pressurization it acts upon the piston wall in the direction in which the volume in the compensating cylinder is decreased, said first cylinder chamber being pressurized to a smaller or larger degree by atmospheric pressure and is controlled by the hydraulic pressure of the pressure generating arrangement, a second cylinder chamber connected to the vacuum, after switching over of the alternating valve, the first cylinder chamber is connected to the vacuum and the second cylinder chamber is pressurized to atmospheric pressure when a brake slip signal is issued and (c) said isolating valve being closed each time at the beginning of the pressure build-up by means of the pressure generating arrangement.

2. A device according to claim 1 wherein the hydraulic piston is shaped in the form of a stepped piston whose annular step is arranged on the side of the hydraulic piston directed away from the compensating chamber, the connecting line ending in an annular pressure chamber at the annular step, and the isolating valve being arranged in a channel of the hydraulic piston, the channel connecting the annular pressure chamber and the compensating cylinder.

3. A device according to claim 2 wherein the isolating valve is pre-loaded by a spring in the direction of closure and is closed when the hydraulic piston is displaced from the inoperative position, and is opened in opposition to the force of the spring by a tappet acting from the opposite side when the hydraulic piston assumes its completely retracted position.

4. A device according to claim 2 wherein a piston rod extends from the side of the annular side of the hydraulic piston and is sealedly guided from the compensating cylinder into the directly axially adjacent vacuum power generator.

5. A device according to claim 2 wherein the hydraulic piston is equipped with a pressure compensating annular step which is arranged axially opposite the annular step and has the same size, and a pedal travel simulator including a piston is connected to the connecting line, a piston rod extends from the compensating cylinder's hydraulic part of the piston formed with the pressure compensating annular step and is sealedly guided from the compensating cylinder into the directly axially connected vacuum power generator.

6. A device according to claim 1 wherein the isolating valve is arranged outside the compensating cylinder and is located in the connecting line, said isolating valve being pre-loaded into the closed position by a spring, and being held in the open position by a piston until the hydraulic pressure in the connecting line moves the piston away from the isolating valve, in opposition to the force of a retracting spring.

7. A device according to claim 6 wherein the piston is a component part of a pedal travel simulator.

8. A device according to claim 5 wherein the pressure chamber of the cylinder including the piston is connected to the connecting line via a switchable non-return valve, and in that the vacuum-controlled actuating device opens the non-return valve when a vacuum prevails and otherwise closes it.

9. A device according to claim 1 wherein the pressure generating arrangement is a hydraulic master cylinder which is acted upon by a brake pedal.

* * * * *